United States Patent
Yao et al.

(10) Patent No.: US 7,224,550 B2
(45) Date of Patent: May 29, 2007

(54) HARD DISK DRIVE DEVICE AND METHOD OF ASSEMBLING THE HARD DISK DRIVE DEVICE

(75) Inventors: Ming Gao Yao, Dongguan (CN); Masashi Shiraishi, Kowloon (HK); Yi Ru Xie, Dongguan (CN)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 19 days.

(21) Appl. No.: 10/435,128

(22) Filed: May 9, 2003

(65) Prior Publication Data

US 2004/0100723 A1 May 27, 2004

(30) Foreign Application Priority Data

Nov. 25, 2002 (WO) .................... PCT/CN02/00844

(51) Int. Cl.
- *G11B 33/12* (2006.01)
- *G11B 33/02* (2006.01)
- *G11B 25/04* (2006.01)

(52) U.S. Cl. .................................... 360/97.01
(58) Field of Classification Search ............ 360/97.01, 360/98.01, 98.08, 99.08, 99.12, 265.6
See application file for complete search history.

(56) References Cited

U.S. PATENT DOCUMENTS

| 4,712,146 A | 12/1987 | Moon et al. ............ 360/97 |
| 4,782,410 A * | 11/1988 | Okutsu .................. 360/98.08 |
| 5,074,029 A * | 12/1991 | Brooks et al. ........... 29/603.03 |
| 5,223,993 A | 6/1993 | Squires et al. ........... 360/77.08 |
| 5,282,100 A | 1/1994 | Tacklind et al. ......... 360/97.02 |
| 5,329,412 A | 7/1994 | Stefansky ................ 360/97.01 |
| 5,471,733 A * | 12/1995 | Bernett et al. ........... 29/603.03 |
| 5,559,650 A | 9/1996 | Repphun et al. ......... 360/97.02 |
| 5,568,341 A | 10/1996 | Shikano ................... 360/97.02 |
| 5,754,372 A * | 5/1998 | Ramsdell et al. ........ 360/265.6 |
| 5,991,123 A | 11/1999 | Casey ....................... 360/104 |
| 6,011,670 A | 1/2000 | Balsley, Jr. et al. ...... 360/97.01 |
| 6,560,075 B2 * | 5/2003 | Price et al. .............. 360/264.3 |
| 2005/0105211 A1 * | 5/2005 | Ho et al. ................. 360/97.01 |

FOREIGN PATENT DOCUMENTS

| EP | 526703 A2 * | 2/1993 |
| EP | 647942 A1 * | 4/1995 |
| JP | 57113469 A * | 7/1982 |
| JP | 04023277 A * | 1/1992 |
| JP | 07249287 A * | 9/1995 |
| JP | 10144069 A2 | 5/1998 |
| JP | 11096664 A * | 4/1999 |
| JP | 11288574 A * | 10/1999 |
| JP | 2000100061 A * | 4/2000 |
| JP | 2001202682 A * | 7/2001 |

* cited by examiner

*Primary Examiner*—William J Klimowicz
(74) *Attorney, Agent, or Firm*—Kenyon & Kenyon LLP

(57) ABSTRACT

A hard disk drive device and method for assembling such a device are provided. The hard disk drive device includes storage medium components comprising a drive motor and disk for digital data storage, which are attached to a section of a casing that encloses the drive's mechanical components. Opposite the storage medium components, the read/write components including the actuator assembly, and heads are attached to a different section of the casing.

18 Claims, 4 Drawing Sheets

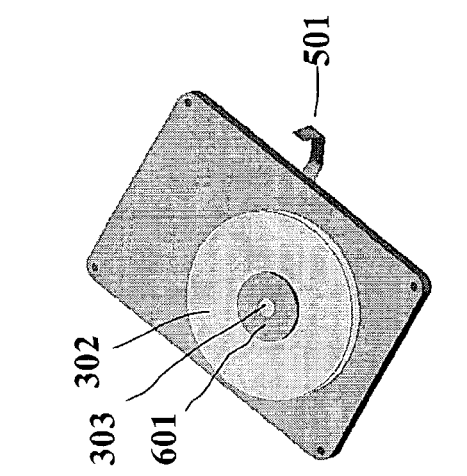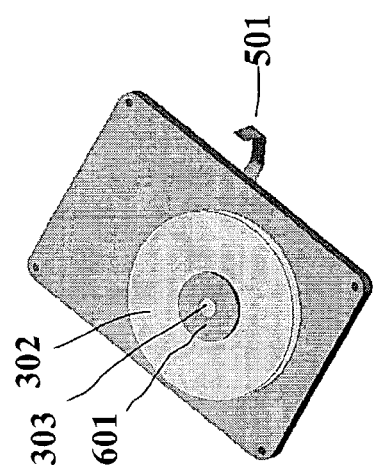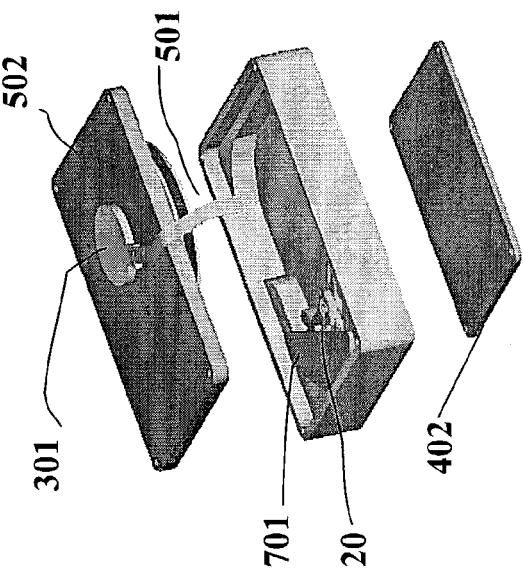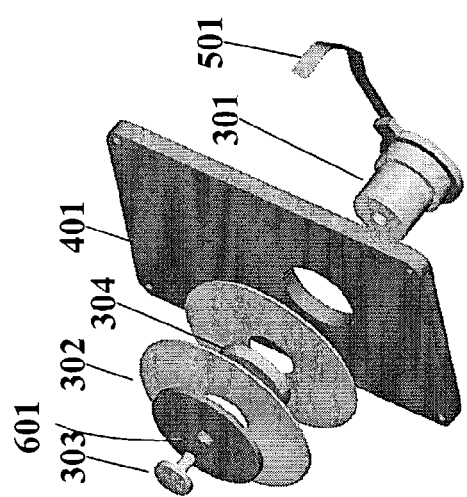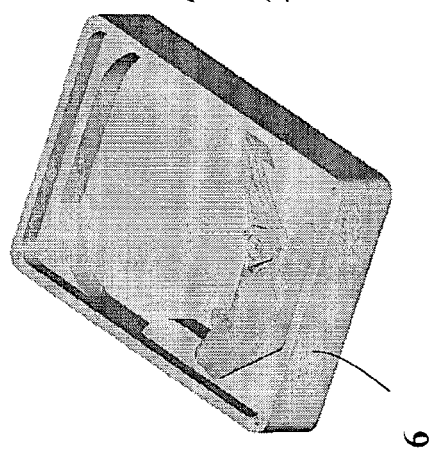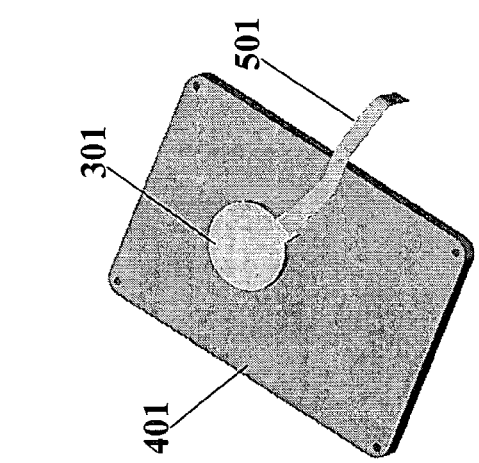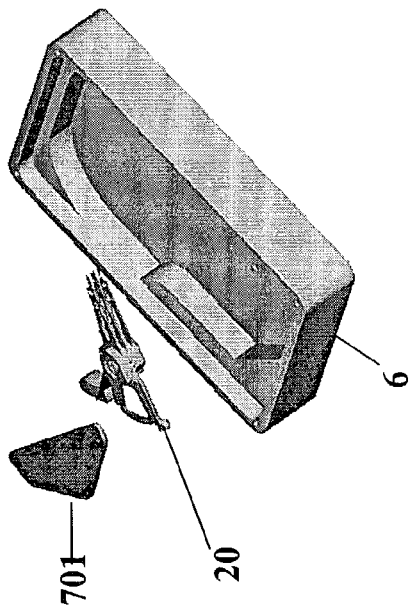

HARD DISK DRIVE DEVICE AND METHOD OF ASSEMBLING THE HARD DISK DRIVE DEVICE

FIELD OF THE INVENTION

The present invention relates to the assembly of hard disk drives (HDDs). More specifically, the present invention provides an apparatus and method for assembly HDDs, where the storage medium components are assembled in a hard disk drive cover and the read/write components are assembled in a hard disk drive body.

BACKGROUND OF THE INVENTION

Hard disk drives are used to store digital data. An example of a HDD is shown in FIG. 1. The HDD may include a read/write head 1, which reads and writes digital data to a magnetic storage medium 2. Like numbers refer to like elements throughout the specification.

The read/write head 1 is part of the head stack assembly (HSA) 20, shown in more detail in FIG. 2. The HSA 20 includes a head 1, a head gimbal assembly (HGA) 3, and an actuator assembly 4. The HGA 3 holds the head 1 above the storage medium 2 while the actuator assembly 4, which pivots on pivot 21, positions the HGA 3 so that the head 1 is above one of the many tracks on one of the platters of the storage medium 2. The actuator assembly may also include a voice-coil motor (VCM) as port of the actuator assembly 4.

A typical HDD has mechanical components enclosed within a casing that consists of two main parts, a base casing and a cover. Either the base casing or the cover may have a relatively flat surface, while the other side may have a bowl-shape to accommodate the components that are enclosed therein. FIG. 1 illustrates a typical HDD 10 in the art today, where the base casing 6 is bowl shaped, and the cover, although not shown would have a relatively flat surface.

FIG. 3 shows a typical HDD that is known in the prior art. According to FIG. 3, the HSA 20, the spindle motor 301, one or more platters 302, and the spindle cover 303 are attached to the base casing 6. After these parts are attached, the cover 401 and an electric control body 402 are attached to the base casing as shown in FIG. 4.

Great care needs to be used when assembling components to the base casing 6, as the actuator assembly 4 and HGA 3, including the head(s) 1, are very fragile and the process of assembling the spindle motor 301 with the storage medium 302 and the disk cover 303 may damage these parts, since attaching the medium 302 and the disk cover 303 with the spindle motor requires a significant twisting force. In addition, because both the spindle motor 301 and storage medium 2 are assembled in the same section of the casing 6 as the HSA 20, the assembly steps occur serially, which wastes time as compared to an assembly process which uses parallel steps to assemble the cover and base casing.

Therefore, it is desirable to have a method and device, which may separate assembling steps of the hard drive into parallel steps by allowing the actuator and other read/write components to be assembled in a section of the casing that is different from the section of the casing where the spindle motor and storage medium are assembled.

SUMMARY OF THE INVENTION

The present invention provides both hard disk drive devices and methods of assembling these hard disk drive devices. One embodiment of the present invention includes a method of assembling a hard disk drive device comprising coupling a first section of a casing for the hard disk drive device to at least one disk for data storage and at least one component for rotating the at least one disk and coupling an opposing section of the casing for the hard disk drive device to components for at least one of reading data from and writing data to the at least one disk.

Another embodiment of the present invention provides, a hard disk drive device comprising a first section of a casing for the hard disk drive coupled to at least one disk for data storage and at least one component for rotating the at least one disk, an opposing section of the casing for the hard disk drive coupled to a component for at least one of reading data from and writing data to the at least one disk, and wherein the first section of the casing is configured to be joined to the opposing section of the casing.

In yet another embodiment of the present invention, a method of assembling a hard disk drive device is provided. The method includes the steps of assembling a first component including a first section of a casing for the hard drive coupled to at least one disk for data storage and at least one component for rotating the at least one disk and assembling a second component including an opposing section of the casing for the hard disk drive coupled to a component for at least one of reading data from and writing data to the at least one disk.

BRIEF DESCRIPTION OF THE DRAWINGS

FIG. 5 shows a perspective view of a top surface of a HDD cover of an embodiment of the present invention.

FIG. 6 shows an exploded view of the HDD cover of FIG. 5.

FIG. 7 shows a perspective view of the bottom surface of the HDD cover of FIG. 5.

FIG. 8 shows an exploded view of a HDD casing according to an embodiment of the present invention.

FIG. 9 shows a perspective view of the HDD casing of FIG. 8.

FIG. 10 shows an exploded view of an HDD according to an embodiment of the present invention.

DETAILED DESCRIPTION

Figure 1:
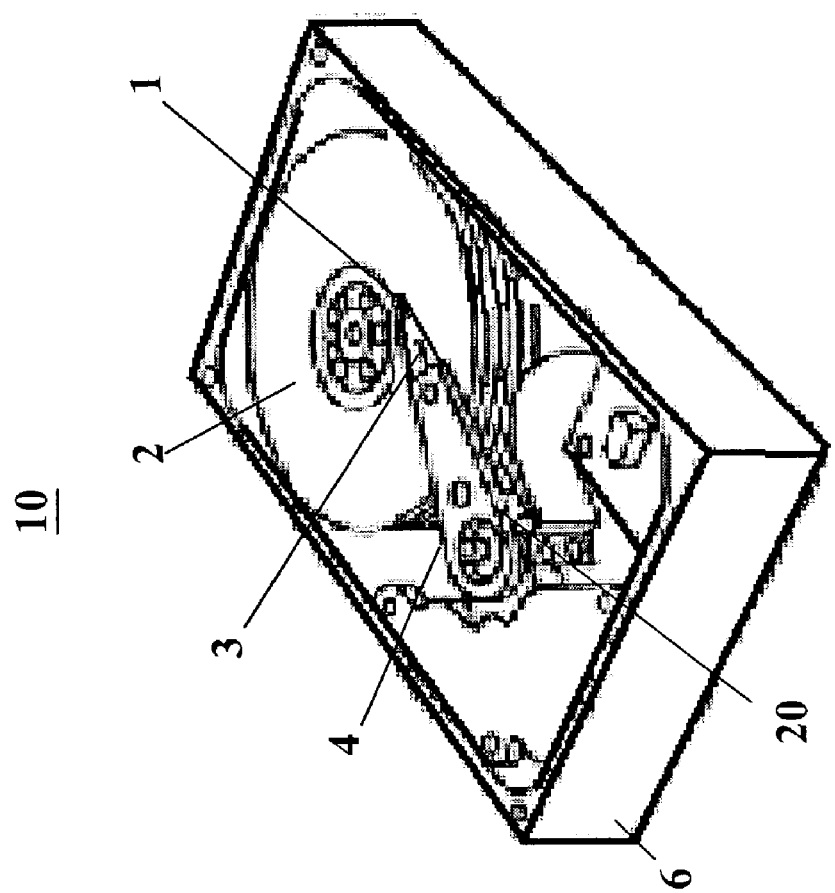
FIG. 1 shows a perspective view of a prior art HDD, including a HSA, a spindle motor, and a storage medium attached to one section of the HDD casing.
Figure 2:
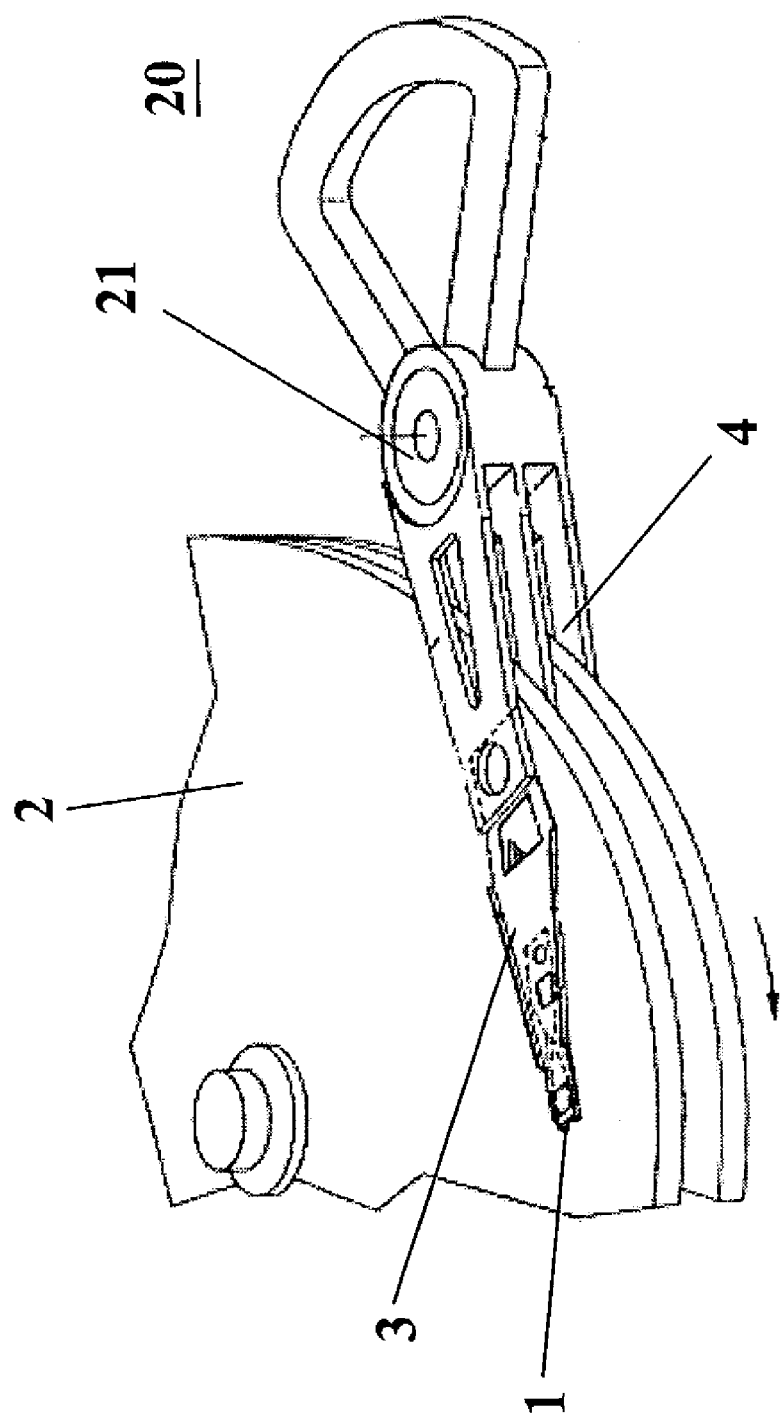
FIG. 2 shows an enlarged perspective view of a prior art HSA and storage medium for a magnetic HDD.

FIGS. 5–10 show an embodiment of an HDD of the present invention. The HDD shown includes a VCM actuator 20, which reads data from and writes data to several HDD platters 302. In other embodiments of the present invention, the HDD may have one or more actuators, or one or more HDD platters.

FIG. 5 shows a top surface of a first section of the HDD casing 401, also referred to herein as a cover. The cover 401 may have attached thereto a spindle motor 301 and a flexible printed circuit (FPC) cable 501. The FPC cable 501 may electrically connect the spindle motor 301 to the electric control body 402 (not shown in FIG. 5).

FIG. 6 shows an exploded view of the cover 401 and its components. As shown in FIG. 5, the spindle motor 301 and the FPC cable 501 are illustrated. Also shown in FIG. 6 are the spindle motor 301 coupled to multiple HDD platters 302, spacer ring 304, spindle spacer 601, and spindle cover 303. The spindle motor 301 and the FPC cable 501 are visible from the tope surface of the cover 401. The HDD platters 302, spacer ring 304, spindle spacer 601, and spindle cover 303 are visible from the bottom surface of the cover 401. The spindle motor 301 rotates the HDD platters 302, which are magnetic disks.

FIG. 7 shows a fully constructed cover 401, which may be combined with the rest of the HDD components. As shown in FIG. 7, one can see the bottom surface of cover 401, including the HDD platters 302, the spindle spacer 601, and the spindle cover 303. Also visible is the FPC cable 501 extending from the top surface of cover 401.

Figure 4:
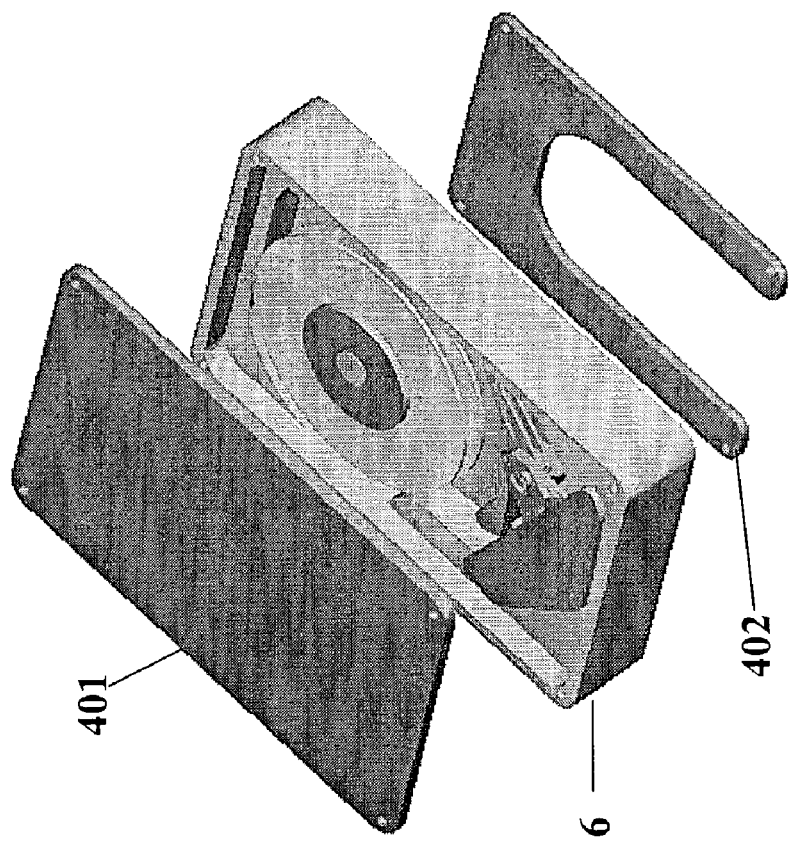
FIG. 4 shows an exploded view of a prior art HDD including a cover and an electronic control body attached to a base casing.
Figure 3:
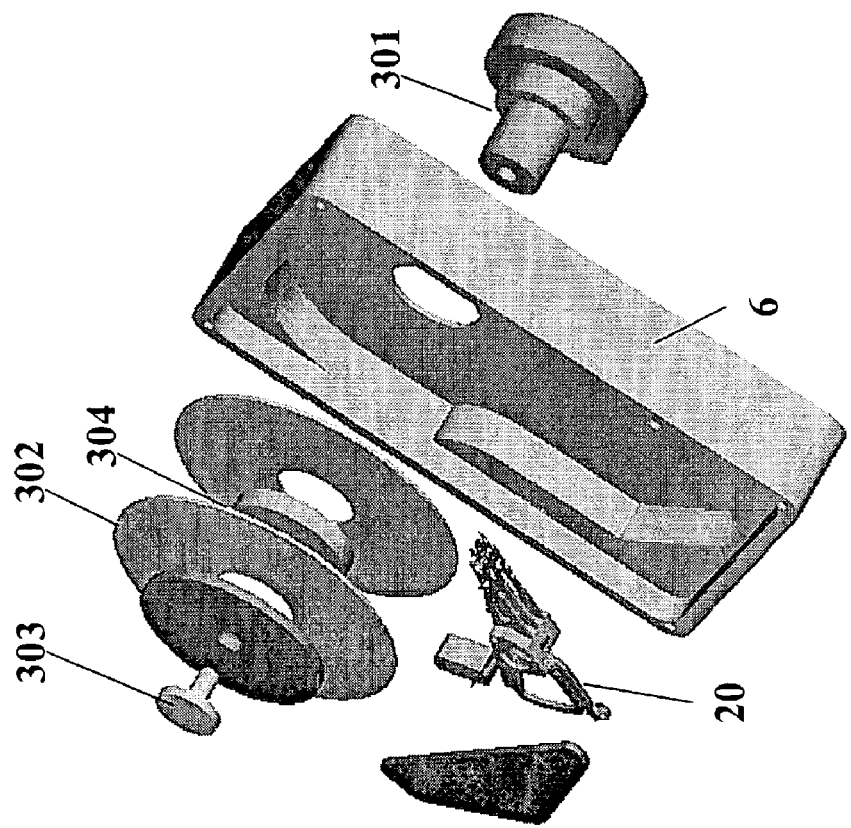
FIG. 3 shows an exploded view of a prior art HDD including a VCM, a head, and a disk, which are all attached to one section of the hard drive casing.

As shown in FIGS. 5–7, the storage medium components of the HDD are combined in the cover 401. This is in marked contrast to the prior art HDD device shown in FIGS. 3 and 4. The present invention's assembly of the HDD storage components separately from the HDD read/write components allows for a reduction in assembly time, a reduction in damage to the magnetic head, the head suspension, the magnetic disk etc., and an improvement in the process yield. In a preferred embodiment of the present invention, the separate components are assembled in parallel steps, further reducing the assembly time required.

FIGS. 8–9 show the assembly of the read/write components of the present invention HDD. In FIG. 8, a second or other section of the HDD casing 6, also referred to herein as a base casing or bowl, is shown. The parts of the HDD to be assembled in the base casing 6 include a magnet assembly 701 for a VCM, and a VCM actuator 20. The VCM 20 may include one or more magnetic heads. The magnetic head(s) may be optical, thin film, or combinations thereof. The base casing 6 opposes cover 401 in the finished HDD device. FIG. 9 shows the read/write components coupled to the bottom of casing 6.

FIG. 10 shows an exploded view of an assembled HDD device according to the present invention, including the cover 401 of FIG. 7 and the bottom casing 6 of FIG. 9. In addition, an electric control body 402 is coupled to the outside surface of the bottom casing 6. Also, the spindle motor 301 may be electrically connected to the electric control body 402 through FPC cable 501. As shown in FIG. 10, a portion of the components coupled to cover 401 fit inside a bowl section of the bottom casing 6 when the cover 401 is joined to bottom casing 6.

As described earlier, the separate assembly of the cover 401 including the storage components and the bottom casing 6 including the read/write components, allows for parallel construction and thus a reduction in assembly time. In addition, because the process of attaching the spindle motor to one section of the casing may damage the read/write heads, VCM or other fragile components, attaching the spindle motor in a separate process reduces the risk of damage to these components during assembly.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A method of assembling a hard disk drive device comprising:
    initially mounting at least one disk for data storage and at least one component for rotating said at least one disk to a first section of a casing for the hard disk drive device; and initially mounting components for at least one of reading data from and writing data to said at least one disk to an opposing section of the casing for the hard disk drive device to enclose the at least one disk for data storage wherein said first section of the casing is combined to said opposing section such that at least a part of said first section is located inside said opposing section.

2. The method of claim 1, further comprising, joining said first section of the casing to said opposing section of the casing.

3. The method of claim 1, further comprising coupling an electric control body to an outside surface of said casing.

4. The method of claim 3, wherein said electric control body is electrically connected to said at least one component for rotating said at least one disk.

5. The method of claim 1, wherein said at least one disk for data storage consists of two or more magnetic disks for data storage.

6. The method of claim 1, wherein said component far at least one of reading data from and writing data to said at least one disk includes a voice coil motor.

7. The method of claim 1, wherein said component for at least one of reading data from and writing data to includes one or more magnetic beads.

8. The method of claim 1, wherein said component for at least one of reading data from and writing data to includes one or more heads, wherein the heads are optical heads, thin film heads, or combinations thereof.

9. The method of claim 1 wherein said at least one component for rotating said at least one disk is a spindle motor.

10. A method of assembling a hard disk drive device comprising:
    assembling a first component including a first section of a casing for the hard drive with at least one disk for data storage and at least one component for rotating said at least one disk initially mounted to the first section;
    assembling a second component including an opposing section of the casing for the hard disk drive with a component for at least one of reading data from and writing data to said at least one disk initially mounted to the opposing section to enclose the at least one disk for data storage wherein said first section of the casing is joined to said opposing section such that at least part of said first section is located inside said second section.

11. The method of claim 10, further comprising joining the first and second components.

12. The method of claim 11, wherein an electric control body is coupled to an outside surface of said casing.

13. The method of claim 12, wherein said electric control body is electrically connected to said component for rotating said at least one disk.

14. The method of claim 10, wherein said at least one disk for data storage consists of two or more magnetic disks for data storage.

15. The method of claim 10, wherein said component for at least one of reading data from and writing data to said at least one disk includes a voice coil motor.

16. The method of claim 10, wherein said component for at least one of reading data from and writing data to includes one or more magnetic heads.

17. The method of claim 10, wherein said component for at least one of reading data from and writing data to includes one or more heads, wherein the heads are optical, thin film, or combinations thereof.

18. The method of claim 10, wherein said component for rotating said at least one disk is a spindle motor.

* * * * *

UNITED STATES PATENT AND TRADEMARK OFFICE
CERTIFICATE OF CORRECTION

PATENT NO. : 7,224,550 B2  
APPLICATION NO. : 10/435128  
DATED : May 29, 2007  
INVENTOR(S) : Ming Gao Yao et al.

Page 1 of 1

It is certified that error appears in the above-identified patent and that said Letters Patent is hereby corrected as shown below:

Column 1, Line 28 "as port of"  
should be --as part of--

Column 2, Line 7 "invention provides, a"  
should be --invention provides a--

Column 3, Line 7 "from the tope surface"  
should be --from the top surface--

Column 4, Line 23 "wherein said component far at"  
should be --wherein said component for at--

Column 4, Line 28 "one or more magnetic beads"  
should be --one or more magnetic heads--

Signed and Sealed this

Eighteenth Day of August, 2009

David J. Kappos  
*Director of the United States Patent and Trademark Office*